US 11,796,683 B2

(12) United States Patent
Kaplan (10) Patent No.: US 11,796,683 B2
(45) Date of Patent: Oct. 24, 2023

(54) PHASED-ARRAY ANTI-JAMMING DEVICE AND METHOD

(71) Applicant: Infinidome Ltd., Caesarea (IL)

(72) Inventor: Moshe Kaplan, Pardes Hana (IL)

(73) Assignee: Infinidome Ltd., Caesarea (IL)

( * ) Notice: Subject to any disclaimer, the term of this patent is extended or adjusted under 35 U.S.C. 154(b) by 592 days.

(21) Appl. No.: 16/963,555

(22) PCT Filed: Jan. 21, 2019

(86) PCT No.: PCT/IL2019/050080
§ 371 (c)(1),
(2) Date: Jul. 21, 2020

(87) PCT Pub. No.: WO2019/142198
PCT Pub. Date: Jul. 25, 2019

(65) Prior Publication Data
US 2021/0048535 A1    Feb. 18, 2021

Related U.S. Application Data

(60) Provisional application No. 62/619,832, filed on Jan. 21, 2018.

(51) Int. Cl.
*G01S 19/21* (2010.01)
*H01Q 3/38* (2006.01)
(Continued)

(52) U.S. Cl.
CPC ............. *G01S 19/21* (2013.01); *H01Q 3/38* (2013.01); *H04B 7/0885* (2013.01); *H04K 3/228* (2013.01);
(Continued)

(58) Field of Classification Search
CPC ......... G01S 19/21; G01S 19/215; H04K 3/28; H04K 3/228; H04K 3/90; H01Q 3/38;
(Continued)

(56) References Cited

U.S. PATENT DOCUMENTS 5,990,831 A  * 11/1999  McDowell .............. G01S 19/21
                                                            342/17
6,124,828 A     9/2000  Champeau
(Continued)

FOREIGN PATENT DOCUMENTS

CN        1868147        11/2006
CN      103323862         9/2013
(Continued)

OTHER PUBLICATIONS

Notification of Office Action and Search Report dated Sep. 2, 2021 From the State Intellectual Property Office of the People's Republic of China Re. Application No. 201980019221.4 together with an English Summary. (14 Pages).
(Continued)

*Primary Examiner* — Gregory C. Issing (57) ABSTRACT

A phased array anti-jamming device, comprising a plurality (N) of antennas and a plurality of splitters connected to the antennas and adapted to split an RF stream received from the antennas. The phased array anti-jamming device further includes at least one digital signal processor adapted to digitally analyze a digital output of digital processing channels and to split the output into a plurality of digital down converted representations of respective analog outputs of a plurality of analog digital processing channels in a plurality of different frequencies and calculate at least one instructions selected from phase shift, amplification, and attenuation instructions for each one of the plurality of antennas per each one of the plurality of different frequencies. The phased array anti-jamming device further includes a plurality of phase shifter groups a plurality of group combiners and a main combiner adapted to sum outputs of the plurality of group combiners.

18 Claims, 6 Drawing Sheets

(51) Int. Cl.
  *H04B 7/08* (2006.01)
  *H04K 3/00* (2006.01)
(52) U.S. Cl.
  CPC ................ *H04K 3/28* (2013.01); *H04K 3/90* (2013.01); *H04K 2203/32* (2013.01)
(58) Field of Classification Search
  CPC ...... H04B 1/0057; H04B 1/10; H04B 1/1027; H04B 1/709; H04B 1/715; H04B 2001/7152
  See application file for complete search history.

(56) References Cited

U.S. PATENT DOCUMENTS

| | | | |
|---|---|---|---|
| 6,784,831 B1 | 8/2004 | Wang et al. | |
| 8,743,914 B1* | 6/2014 | Jensen | H04B 7/086 370/537 |
| 2002/0122473 A1* | 9/2002 | Leblond | H04B 7/0848 375/346 |
| 2004/0176102 A1* | 9/2004 | Lawrence | G01S 19/44 455/456.1 |
| 2011/0050489 A1 | 3/2011 | Maenpa et al. | |
| 2012/0108178 A1* | 5/2012 | Lee | H04B 7/086 455/67.11 |
| 2021/0048535 A1* | 2/2021 | Kaplan | H04K 3/28 |

FOREIGN PATENT DOCUMENTS

| | | | |
|---|---|---|---|
| CN | 103685098 | 3/2014 | |
| CN | 105119662 | 12/2015 | |
| DE | 102013109439 B3 * | 11/2014 | ............ G01S 19/28 |
| EP | 2256947 | 12/2010 | |
| EP | 2908155 A1 * | 8/2015 | ............ G01S 19/21 |
| EP | 3428688 A1 * | 1/2019 | ........... G01S 19/215 |
| WO | WO 2013/154584 | 10/2013 | |
| WO | WO 2019/142198 | 7/2019 | |

OTHER PUBLICATIONS

Supplementary European Search Report and the European Search Opinion dated Sep. 15, 2021 From the European Patent Office Re. Application No. 19741443.6. (6 Pages).

International Preliminary Report on Patentability dated Jul. 30, 2020 From the International Bureau of WIPO Re. Application No. PCT/IL2019/050080. (8 Pages).

International Search Report and the Written Opinion dated Apr. 30, 2019 From the International Searching Authority Re. Application No. PCT/IL2019/050080. (21 Pages).

Trinkle et al. "Null-Steering GPS Dual-Polarised Antenna Arrays", GPS, Australian Global Positioning Systems Society Inc., Presented at SatNav 2003, The 6th International Symposium on Satellite Navigation Technology Including Mobile Positioning & Location Services, Melbourne, Australia, Jul. 22-25, 2003, Paper 11, p. 1-10, Jul. 22, 2003.

* cited by examiner

PHASED-ARRAY ANTI-JAMMING DEVICE AND METHOD

RELATED APPLICATION/S

This application is a National Phase of PCT Patent Application No. PCT/IL2019/050080 having International filing date of Jan. 21, 2019, which claims the benefit of priority under 35 USC § 119(e) of U.S. Provisional Patent Application No. 62/619,832 filed on Jan. 21, 2018. The contents of the above applications are all incorporated by reference as if fully set forth herein in their entirety.

FIELD AND BACKGROUND OF THE INVENTION

Some embodiments of the present invention relate to phased-array devices and methods, and, more specifically, but not exclusively, to phased-array anti-jamming devices and methods.

Global navigation satellite systems (GNSS) provide signals utilized in determining global positions of various applications, such as, moving vehicles, cellular phones, etc. GNSS antennas receive signals from a plurality of GNSS satellites and associated GNSS receivers determine positions based on timing of codes and carriers in the received GNSS signals.

Jammers may be employed to disrupt particular position calculation operations. Jammers may emit signals at frequencies respective to GNSS satellite signals. The jammer signals received by the GNSS antenna can interfere with the GNSS satellite signals received by the GNSS antenna and effectively prevent a GNSS receiver from determining an accurate position based on the received GNSS satellite signals. In addition, a jammer may emit signals having similar frequencies that not only interfere with the GNSS signals received by the GNSS antenna, but may also interfere with the GNSS satellite signals received by nearby GNSS antennas. A jammer may be used, for example, on a moving vehicle (e.g., delivery truck), to emit jamming signals to the GNSS antenna located on the vehicle, and thus, prevent the GNSS receiver from calculating accurate positions, e.g., determining code and timing needed for position calculation of the vehicle.

SUMMARY OF THE INVENTION

According to some embodiments of some aspects of the present invention, there is provided a phased array anti-jamming device. According to some embodiments, the device comprising: a plurality (N) of antennas adapted to receive radio frequency (RF) radiation; a plurality of splitters each connected to one of the plurality of antennas and adapted to split an RF stream received from the respective antenna into: at least one digital processing channel conveying at least some of the RF radiation through an analog to digital convertor, and a plurality (M) of analog processing channels, each one of the plurality of analog processing channels conveying at least some of the RF radiation according to a plurality of different frequencies; at least one digital signal processor adapted to: digitally analyze a digital output of each of the digital processing channels and to split the output into a plurality of digital down converted representations of respective analog outputs of the plurality of analog digital processing channels in the plurality of different frequencies, and calculate at least one instructions selected from phase shift, amplification, and attenuation instructions for each one of the plurality of antennas per each one of the plurality of different frequencies; a plurality of phase shifter groups each comprising at least one of a phase shifter, an amplifier, and an attenuator adapted to change at least one of phase and level of outputs of the plurality of analog digital processing channels in one of the plurality of different frequencies according to one of the respective phase shift, amplification, and attenuation instructions, each one of the plurality of phase shifter groups comprises a respective phase shifter in each of the plurality of antennas; a plurality of group combiners each adapted to sum an output of one of the plurality of phase shifter groups; and a main combiner adapted to sum outputs of the plurality of group combiners.

According to some embodiments, the at least one digital processing channel(s) conveying at least some of the RF radiation through a down convertor unit.

According to some embodiments, the device further comprising one or more phased lock loops (PLL) and/or oscillators for varying the frequency in each of a plurality of outputs respective to one or more radiations received in each of the plurality of antennas.

According to some embodiments, each one of the plurality (M) of analog processing channels conveying at least some of the RF radiation through one of a plurality of different frequency filters adapted to filter at least some of the RF radiation according to a plurality of different frequencies.

According to some embodiments, the distance between two neighboring antennas in the plurality (N) of antennas is at least 5 cm.

According to some embodiments, the digital signal processor utilizes at least one algorithm or tool selected from null-steering algorithm and controlled reception pattern antenna (CRPA) algorithm, to calculate the at least one of phase shift, amplification, and attenuation instructions.

According to some embodiments, the device further comprising a plurality (N) of signal output adjusting elements connected to each of the plurality of the at least one of phase shifters, amplifiers and attenuators, and adapted to vary the signal output in each of the plurality of antennas.

According to some embodiments, the signal output adjusting elements is a pad.

According to some embodiments, the device having a power gain of between 20.0 and 35.0 dB.

According to some embodiments, the radio frequency (RF) radiation band received by the plurality (N) of antennas is at least one of: Global Navigation Satellite System (GNSS), Aviation Radio Navigation Service (ARNS), Radio Navigation Satellite Service (RNSS), Global Positioning System (GPS), Galileo Positioning System, and Galileo Search and Rescue (SAR) System.

According to some embodiments, the RF radiation comprises at least one frequency band selected from: L1 of about 1565 MHz, L2 of about 1227 MHz, L3 of about 1381 MHz and L5 of about 1176 MHz.

According to some embodiments, the device having a fixed group delay of less than 100 ns, in each of a plurality of outputs respective to one or more radiations received in each of the plurality of antennas.

According to some embodiments, the device further comprising an amplifier adapted to increase power intensity of at least one of the outputs.

According to some embodiments, the plurality of antennas (N) is at least 2.

According to some embodiments of some aspects of the present invention, there is provided a phased array anti-jamming method. According to some embodiments, the method comprising: receiving a plurality (N) of RF radiation inputs; splitting at least a portion of the RF radiation to: at least one digital processing channel for conveying at least some of the RF radiation through an analog to digital convertor, and a plurality (M) of analog processing channels for conveying at least some of the RF radiation to generate a plurality of different frequencies; digitally processing a plurality of digital outputs from the at least one digital processing channel per antenna and splitting the digital outputs into a plurality of digital down converted representations of respective analog outputs of the plurality of analog digital processing channels in the plurality of different frequencies; calculating at least one instructions selected from phase shift, amplification, and attenuation instructions for each one of the plurality of antennas per each one of the plurality of different frequencies; changing at least one of phase and level of outputs in the plurality of analog digital processing channels in one of the plurality of different frequencies according to one of the respective phase shift, amplification, and attenuation instructions via a plurality of phase shifter groups each comprising a respective phase shifter for each plurality (N) of RF radiation inputs; combining sum of an output of one of the plurality of phase shifter groups in a plurality of group combiners; combining the sum outputs of the plurality of group combiners; and transmitting the combined sum outputs to a receiver.

According to some embodiments, the changing phase of outputs further comprises at least one of: down converting and filtering.

According to some embodiments, the calculating phase shift instructions is carried out by an algorithm or tool selected from null-steering algorithm and controlled reception pattern antenna (CRPA) algorithm.

According to some embodiments, the combined sum of outputs is transmitted to a single receiver.

Unless otherwise defined, all technical and/or scientific terms used herein have the same meaning as commonly understood by one of ordinary skill in the art to which the invention pertains. Although methods, components, devices, systems and materials similar or equivalent to those described herein can be used in the practice or testing of embodiments of the invention, exemplary methods and/or materials are described below. In case of conflict, the patent specification, including definitions, will control. In addition, the methods, components, devices, systems, materials, and examples are illustrative only and are not intended to be necessarily limiting.

Implementation of the device and/or system and/or method of some embodiments of the invention can involve performing or completing selected tasks manually, automatically, or a combination thereof. Moreover, according to actual instrumentation and equipment of embodiments of the method and/or device and/or method of the invention, several selected tasks could be implemented by hardware, by software or by firmware or by a combination thereof using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system (e.g., to calculate at least one instructions selected from phase shift, and/or amplification, and/or attenuation instructions). In an exemplary embodiment of the invention, one or more tasks according to exemplary embodiments of a device and/or method as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device are optionally provided as well.

BRIEF DESCRIPTION OF THE SEVERAL VIEWS OF THE DRAWING(S)

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Some embodiments of the present invention relate to phased-array devices and methods, and, more specifically, but not exclusively, to phased-array anti-jamming devices and methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments and/or of being practiced and/or carried out in various ways.

Some embodiments of some aspects of the present invention provide a phased-array anti-jamming device, including: a plurality (e.g., N) of antennas, a plurality of splitters, at least one digital signal processor, and a plurality of phase shifters. Some embodiments of the present invention include one or more of: a plurality of phase shifter groups, a plurality of group combiners, and a main combiner. Some embodiments of the present invention further utilize one or more of: a down convertor unit, an analog to digital convertor, a plurality of frequency filters (e.g., M×N), a plurality (M) of analog processing channels, a plurality of digital processors and a plurality of digital processing channels.

Some embodiments of some aspects of the present invention aim at providing an improved, efficient and cost-effective phased-array anti-jamming device and/or method for attenuating signals arriving from undesired directions (e.g., toward unknown sources, such as jamming devices), so that the signals from undesired directions are processed to be reduced in a summarized reception input from receiving antenna array.

The phased-array anti-jamming device and/or method, according to some embodiments of some aspects of the invention, comprises and/or utilizes a plurality of antennas (e.g., receiving array of antennas), optionally a computer-controlled array of antennas, adapted to receive radio frequency (RF) radiation. The RF radiation can be electronically steered to be directed in a desired direction, by summarizing signal reception (and/or transmission) of the array of antennas with a phase difference calculated to direct NULL (e.g., zero phase difference) of the combined antenna signals towards a desired direction (e.g., toward the jammer). As such, the jammer's power effect can be decreased by at least 30 dB.

Some embodiments of the invention provide a phased-array anti-jamming device and/or method that utilizes unique null-steering reception (and/or transmission) characterized by fixed and/or substantially low group delay, e.g., between 50 and 100 ns (nanoseconds), and as such, enables to effectively protect against jamming of any time source element, such as, wireless communications (e.g., signals transmitted to RF receiver). In some embodiments, the anti-jamming device of the invention may be coupled and/or otherwise connected to a receiver for analyzing location and/or time data, such as a radio frequency (RF) receiver (e.g., Global Navigation Satellite System (GNSS), Aviation Radio Navigation Service (ARNS), Radio Navigation Satellite Service (RNSS), Global Positioning System (GPS), Galileo Positioning System, and Galileo Search and Rescue (SAR) System, etc.). In some embodiments, the RF radiation comprises at least one frequency band: L1 of about 1565 MHz, and/or L2 of about 1227 MHz, and/or L3 of about 1381 MHz and/or L5 of about 1176 MHz.

Null-steering involves a spatial signal processing method, in which a reception antenna array directs zero (NULL) against jamming of wireless communications. Compensation for phase difference generated among several reception inputs from the receiving antennas (e.g., due to a number of different reception directions) may be carried out in order to improve the antenna array's performance, for example, by summing and/or averaging signals received from each of the antennas in the plurality of antennas (e.g., by selection of weights by phase shifting antenna signals of different frequencies). The phase shift between the receiver antennas corresponds to the DOA (Direction of Arrival) of the incoming signal, for example, the distance between antennas, and/or distance between the jammer and the antennas. In some embodiments, the distance between two neighboring antennas in the plurality (e.g., N) of antennas is at least 5 cm (e.g., at least 6 cm, and/or at least 8 cm, and/or at least 10 cm, and/or at least 11 cm, and/or at least 12 cm, and/or at least 13 cm and/or at least 15 cm).

Figure 1:
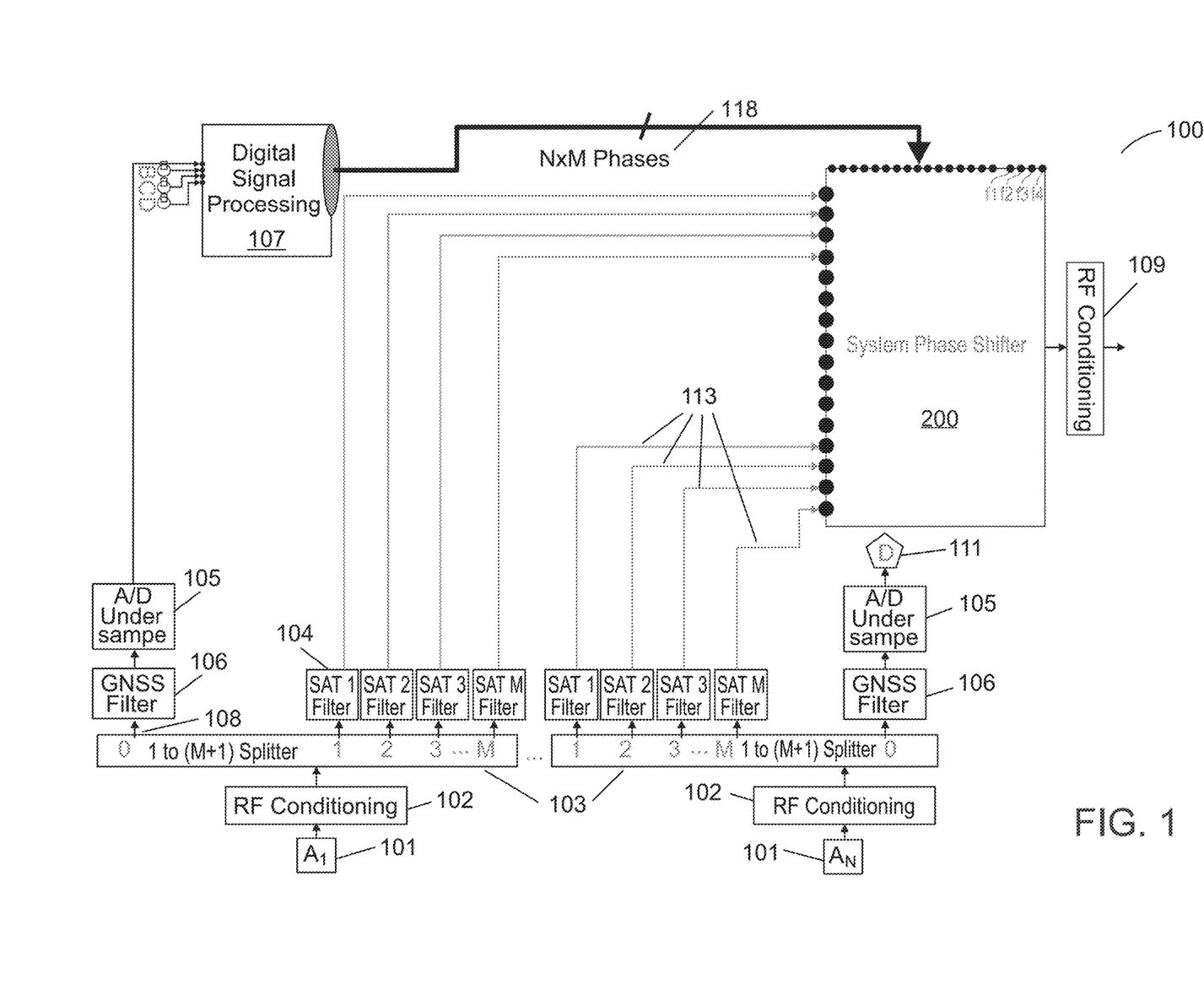
FIG. 1 is a schematic illustration of an exemplary phased-array anti-jamming system, according to some embodiments of the present invention.
Figure 2:
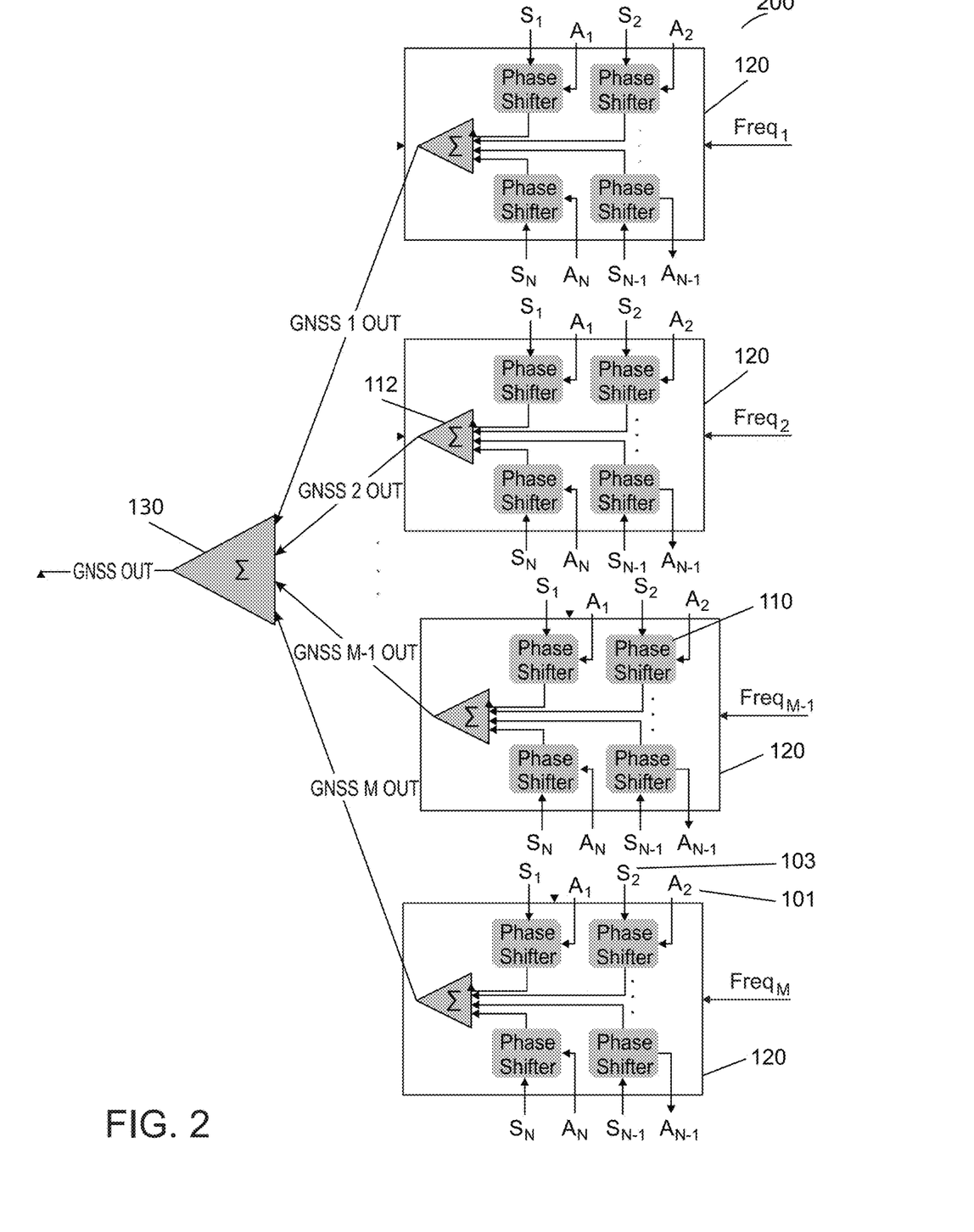
FIG. 2 is a schematic illustration of an exemplary phased shifter array, according to some embodiments of the present invention.
Figure 3:
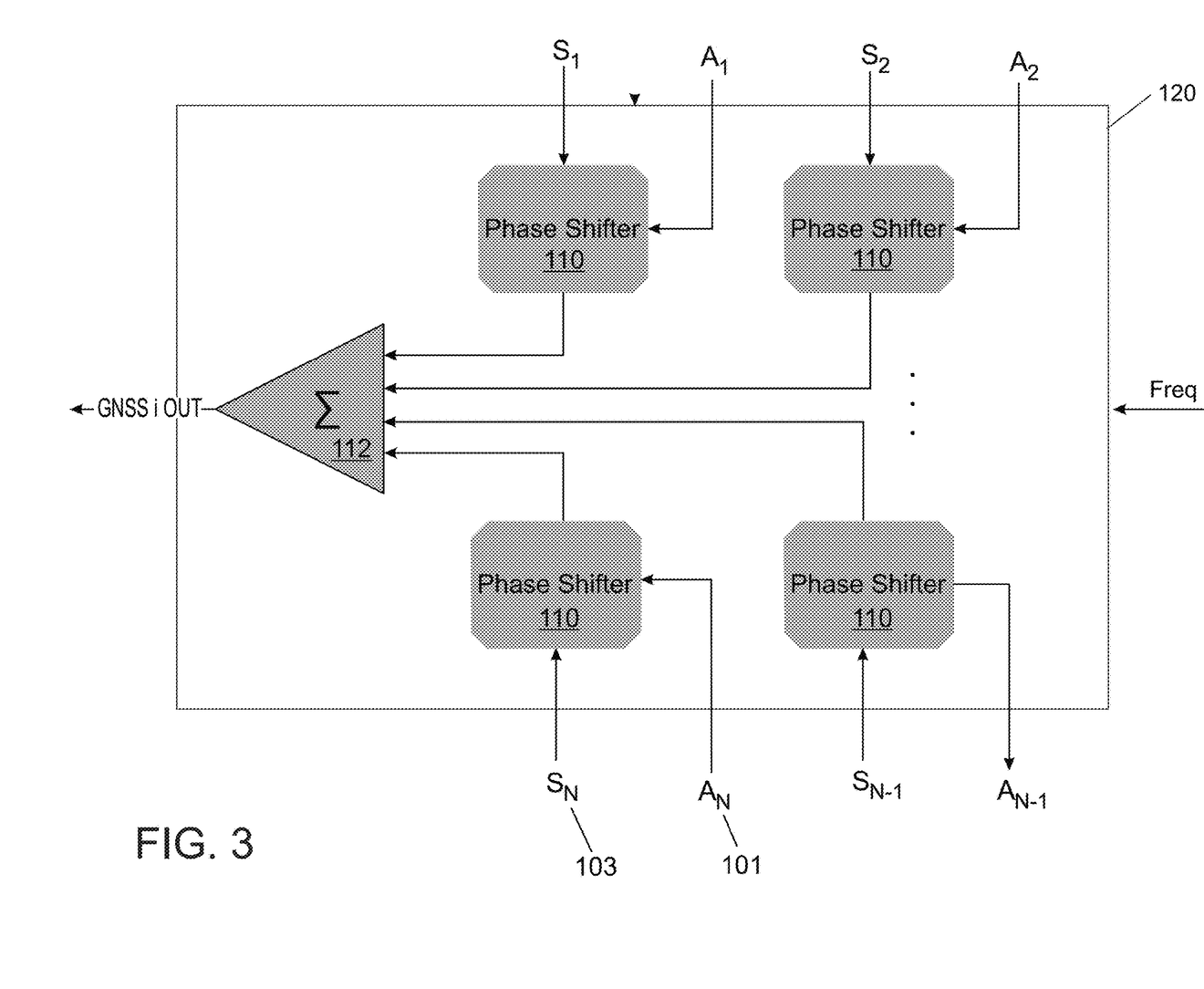
FIG. 3 is a schematic illustration of an exemplary phased shifter group, according to some embodiments of the phased shifter array of FIG. 2.
Figure 6:
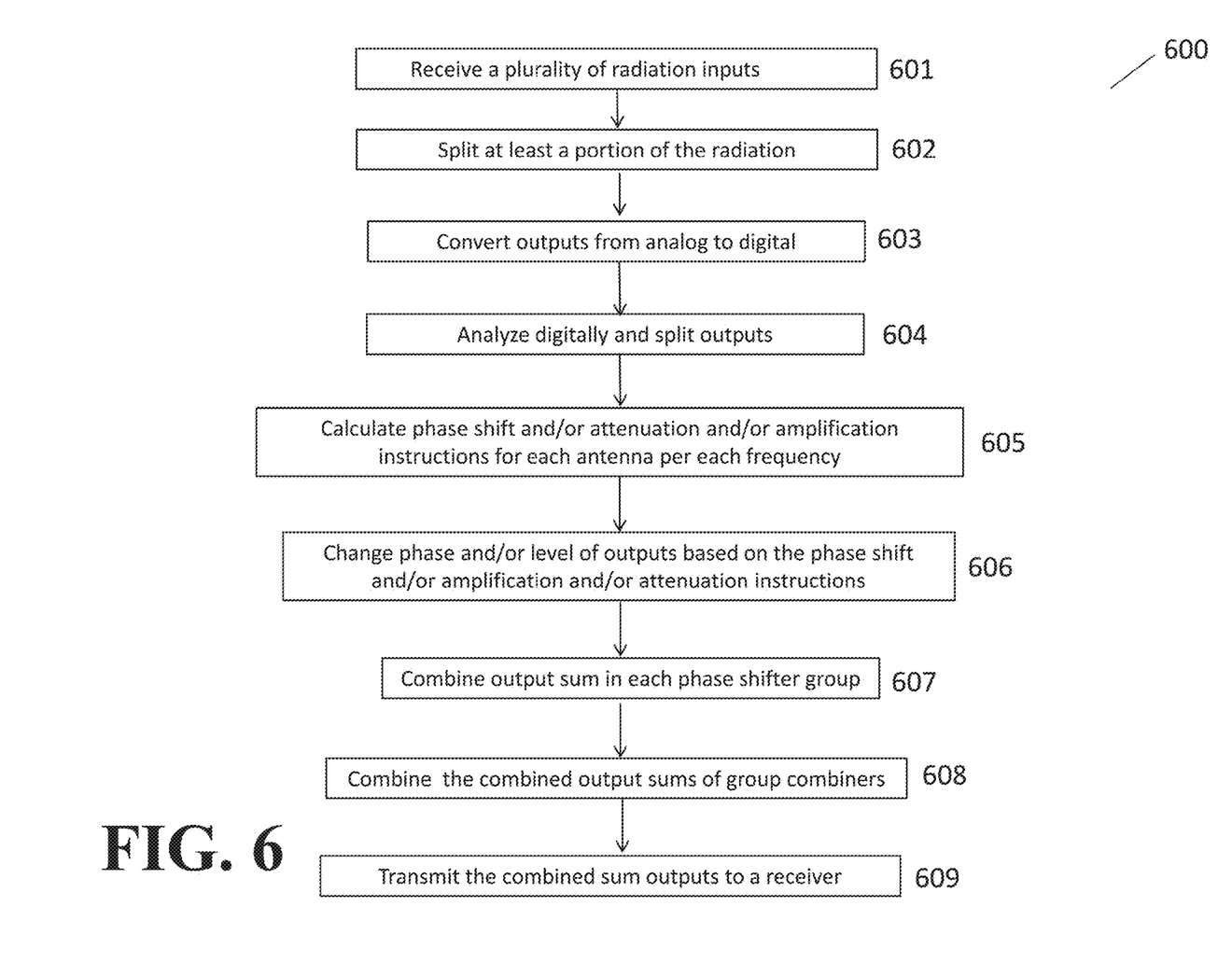
FIG. 6 is a flowchart of an exemplary method of phased-array anti-jamming, according to some embodiments of the present invention.

Reference is now made to FIG. 1, which represents a schematic illustration of an exemplary phased-array anti-jamming system, according to some embodiments of the present invention. Reference is also made to FIGS. 2-3, which present schematic illustrations of an exemplary phased shifter array 200 of FIG. 1 and an exemplary phase shifter group 120 of FIG. 2, respectively, according to some embodiments of the present invention. Reference is also made to FIG. 6, which represents a flowchart of an exemplary method of phased-array anti-jamming, according to some embodiments of the present invention.

Some embodiments of some aspects of the present invention provide a phased-array anti-jamming device 100, including: a plurality (N) of antennas 101, a plurality of splitters 103, and at least one digital signal processor 107. Optionally, some embodiments of the phased-array anti-jamming device 100 include one or more of: a plurality of frequency filters 104, a plurality of phase shifters 110, a plurality of group combiners 112, a plurality of phase shifter groups 120, and a main combiner 130. Optionally, some embodiments utilize one or more of: a down convertor unit 111, an analog to digital convertor 105, a plurality of filters 106, a plurality (M) of analog processing channels 113, at least one digital signal processor 107, and a plurality of digital processing channels 108. Further optionally, one or more of an additional component known in the art of the present invention can be utilized for improving the anti-jamming device's performance by tuning signal intensity in one or more of the antennas 101, e.g., for amplifying signal intensity, and/or for filtering, and/or for modulating, and/or for attenuating, and/or for shifting phase, to generate an output signal having modified intensity (e.g., respective to input signal intensity). Some examples of the components include, RF conditioner(s) 102, 109 (e.g., attenuator, amplifier, filter, pads, etc.) and/or signal modulator(s) 106, and/or down convertor(s) 111, and/or mixer(s). For example, down convertor(s) 111 and/or a signal mixer may be utilized for signal intensity tuning by mixing an input signal with a controlled signal to generate an output signal.

Additionally and/or alternatively, an oscillator (e.g., a local oscillator) optionally having a phased lock loop (PLL), can be included, to set one or more of a frequency for each of the plurality of antennas 101.

Some embodiments of some aspects of the invention utilize an antenna array (e.g., steerable antenna array) to spatially discriminate signals, for example, by attenuating undesired jamming signals. As such, signals received by a plurality of N antennas can attenuate signals arriving from directions by a jamming source(s), by null-steering reception of signals in direction of jammer(s) signals. In some embodiments of various aspects of the invention, the plurality of antennas (N) is at least 2.

Figure 5:
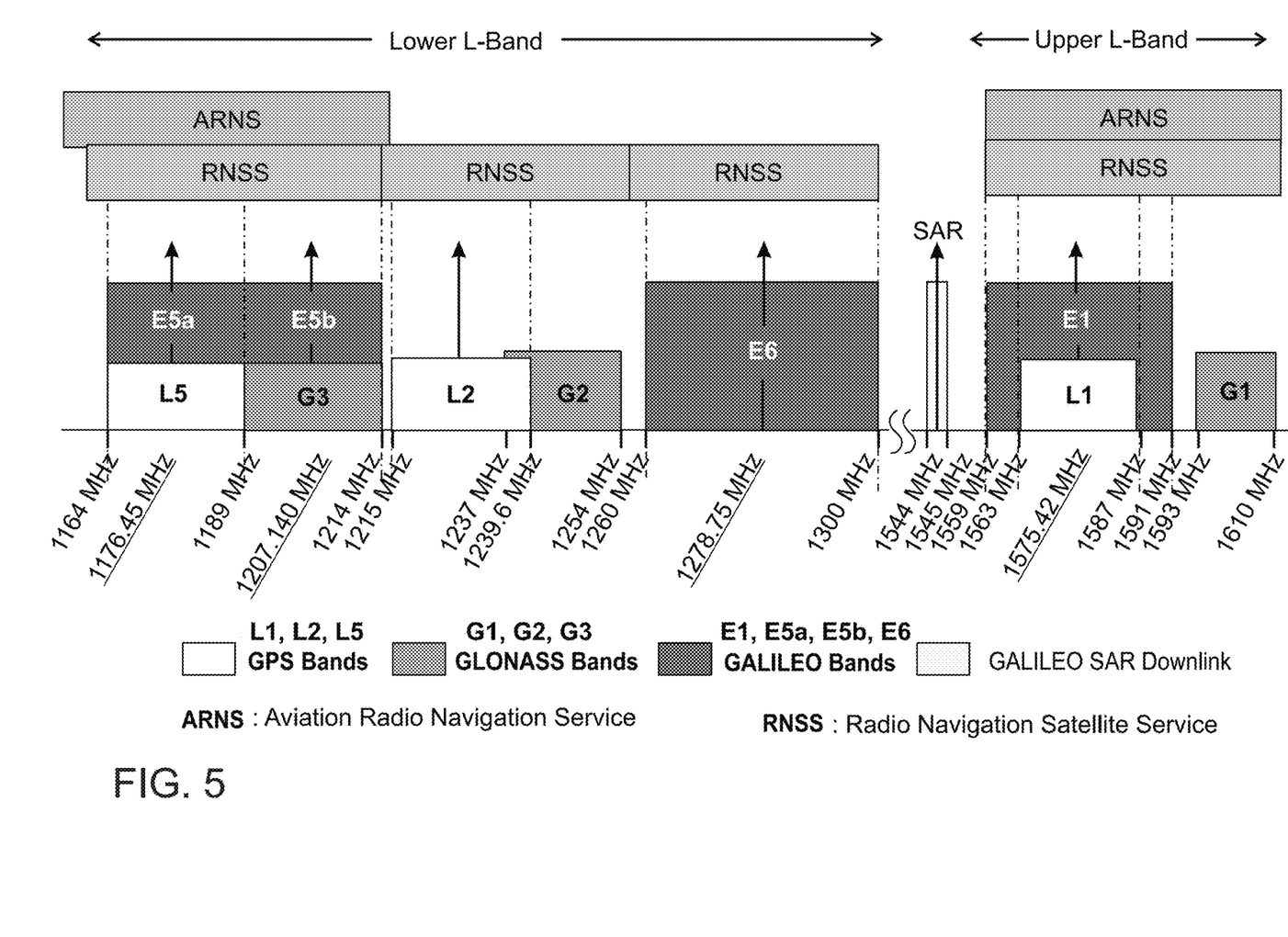
FIG. 5 is a schematic illustration of GNSS navigational frequency bands, according to some embodiments of the present invention.

Null-steering antenna arrays may have various disadvantages, such as difficulty in deployment in certain signal reception environments. For example, if a number of individual jamming sources exceeds a number of formed nulls (e.g., one less than the number of antennas (N−1)), the ability to suppress interference deteriorates. Additionally, it is desired to provide a device and/or method that utilizes phased-array antennas that is not limited to the number of antennas to eliminate antenna complexity for each additional antenna (e.g., hardware, physical installation, etc.), and that is insensitive to the number and/or distribution of jammers. It is thus a further aim of some embodiments of the invention to provide an anti-jamming phased-array device and/or method that is capable of simultaneously protecting three or more of navigational satellite frequency bands, including, for example, lower and/or upper L-frequency bands (e.g., L1, L2, L5 frequency bands—See FIG. 5), and that can achieve high levels of wideband jammer signal cancellation (e.g., by beam forming algorithm).

After receiving a plurality of RF radiation signals in the plurality (N) of antennas 101, 601, each antenna 101 radiates and responds to incident frequency radiation by producing a signal(s). At least a portion of the RF radiation may be split 602 by a plurality of splitters 103 each connected to one of the plurality of antennas 101.

The splitters 103 are adapted to split an RF stream 602 received from the respective antenna 101 into: at least one digital processing channel 108 and a plurality of analog processing channels (M) 113. The at least one digital processing channel 108 can convey at least some of the RF radiation through an analog to digital convertor 105 for converting output signal from analog phase to digital phase 603, optionally through a down convertor unit 111, to convert the signals to a different frequency e.g., by, mixing with an oscillator signal. The plurality of analog processing channels 113 can convey at least some of the RF radiation to generate a plurality of different frequencies. Optionally, a filter 104 may be used to filter at least a portion of the radiation reaching the analog to digital convertor 105.

Then the digitally phase-converted signal can be transmitted to a digital signal processor 107 to digitally analyze digital output(s) of each of the digital processing channels 108 and to split the output(s) into a plurality of digital down-converted representations 118 of respective analog outputs of the plurality of analog digital processing channels 113 in a plurality of different frequencies 604. Phase shift and/or amplification and/or attenuation instructions can be calculated 605 for each one of the plurality of antennas 101 per each one of the plurality of different frequencies.

Some embodiments of the invention provide a phased-array anti-jamming device and/or method that utilizes a plurality of phase shifter groups 120, each comprising a phase shifter 110 adapted to change phase of outputs 606 of the plurality of analog digital processing channels in one of the plurality of different frequencies according to the respective phase shift, and/or amplification, and/or attenuation instructions calculated 605 for each of the plurality of antennas 101. In some embodiments, the changing phase of outputs further comprises: amplifying and/or attenuating. Each one of the plurality of phase shifter groups 120 comprises a respective phase shifter 110 in each of the plurality of antennas 101. In some embodiments, the calculating phase shift instructions 605 is carried out by at least one algorithm and/or tool selected from null-steering algorithm, and/or controlled reception pattern antenna (CRPA) algorithm.

In order to improve the array's performance, relative phases of received signals in the plurality of antennas, can be varied and/or summed (e.g., combining outputs) and/or averaged so that reception is suppressed in a given direction, which may be carried out, if no phase difference exists among the signals at each receiving antenna.

Some embodiments of various aspects of the invention utilize a plurality of group combiners 112 each adapted to sum an output 607 of one of the plurality of phase shifter groups 120. Additionally and/or alternatively, combining the sum outputs of the plurality of group combiners 608, 112 is carried out, optionally in a main combiner 130 adapted to sum outputs of the plurality of group combiners 112. One or more of the combining output(s) steps 607 and/or 608 can comprise multiplying outputs from each antenna in the array with a plurality of weights and then applying these weighted signals to a combiner for summing signal outputs 112, 130.

Then, the combined sum outputs are transmitted to a receiver 609. In some embodiments the combined sum of outputs 607 and/or 608 is transmitted to a single receiver 609. Received signal levels from GPS satellites may be at about −126 dBm, whereas signal levels from jammers may vary based upon transmit power, and/or transmit antenna performance, and/or distance between the jammers and/or receiver antennas. According to some embodiments of some aspects of the invention, phase shift between the antennas may be respective to distribution of receiver antennas and/or direction of arrival (DOA) of input signals, and may be any number between 0 and 360 degrees, when a distance between the antennas is maintained lower than a wavelength.

Figure 4:
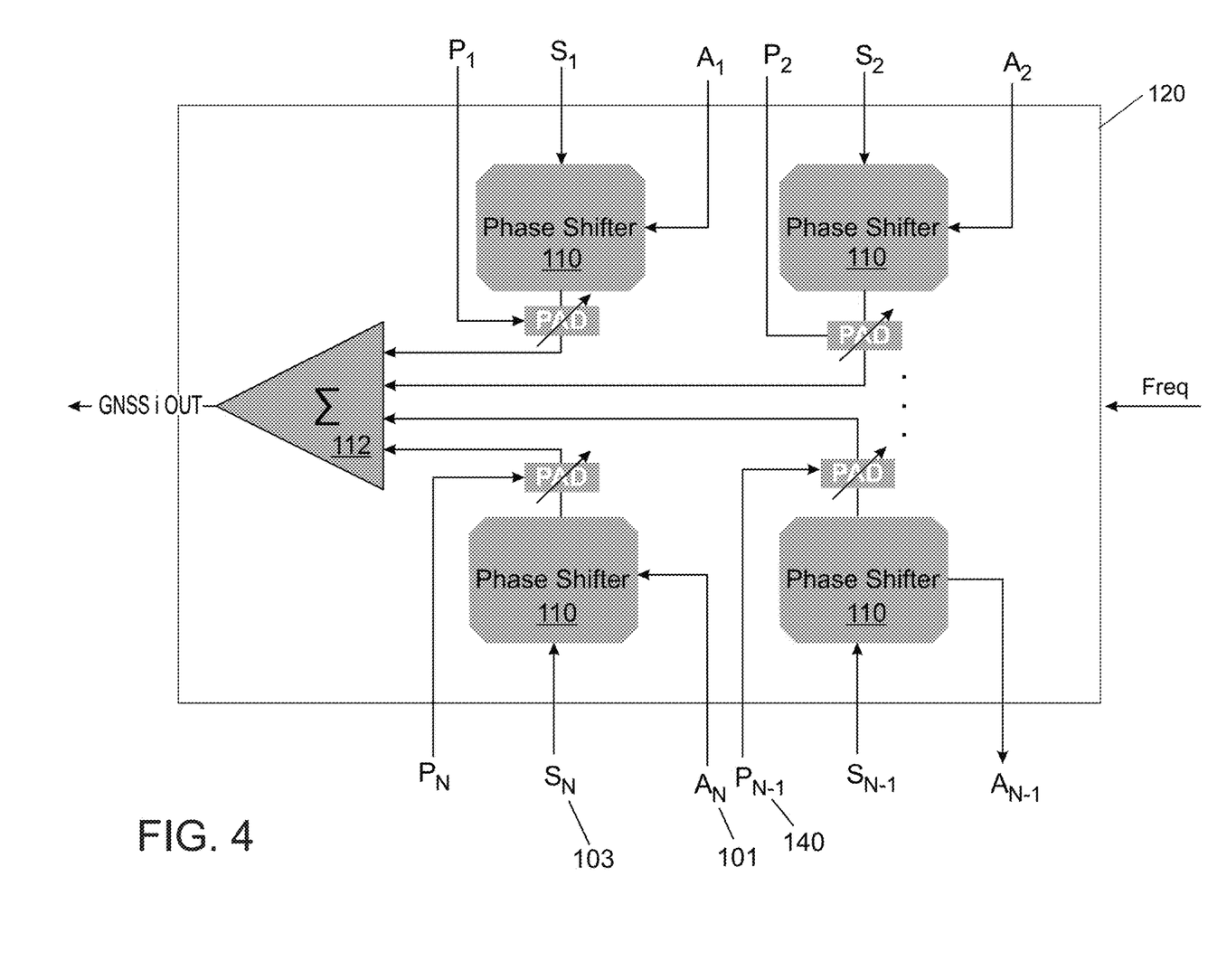
FIG. 4 is a schematic illustration of an additional exemplary phased shifter group having a plurality of controlled amplifiers and/or attenuators connected in series, according to some embodiments of the phase shifter array of FIG. 2.

Some embodiments of some aspects of the invention utilize a plurality (N) of signal output adjusting elements (e.g., pads) connected to each of the phase shifters 110, optionally connected in series, and adapted to vary the signal output(s) in each of the plurality of antennas 101 (e.g., increase and/or decrease intensity of the signal). Reference is made to FIG. 4, which presents an additional exemplary phased shifter group having a plurality of pads 140 connected in series, according to some embodiments of the phase shifter arrays of FIG. 2.

Some embodiments of various aspects of the invention prevent jammer disruption by utilizing null steering (e.g., by directing NULL by the plurality of RF radiation receiving antennas) to gain an essentially significant reduction of the jammer's received signal. Some embodiments utilize null steering, in which reception of the plurality of antennas are characterized by a phase difference that may be calculated to direct the NULL of the combined plurality of antenna signals towards a jammer, thus decreasing its power effect. In some exemplary embodiments of various aspects of the invention, the power effect of the jamming source is decreased by at least 30 dB. Additionally and/or alternatively, in some exemplary embodiments of the invention, the power consumption is lower than 0.75 W (Watts). In some embodiments, the anti-jamming device and/or method is characterized by a group delay of between 30 and 100 ns, in frequency in each of a plurality of outputs respective to one or more radiations received in each of the plurality of antennas.

Additionally and/or alternatively, the anti-jamming device and/or method of the invention is characterized by having a low-noise amplifier gain (LNA) of between 20.0 and 35.0 dB.

Some embodiments of the present invention aim to provide an essentially miniature (e.g., having generally small length, width and/or height) anti-jamming device that allows its concealing from outside. Additionally and/or alternatively, some embodiments of the present invention provide easy integration with a receiver and/or antenna architecture. A further advantage of the device and/or method of the invention is that an increased number (N) of antennas (e.g., N is at least 3, or at least 4) may be more efficiently utilized (increased anti-jamming power intensity), such that an increased number of jammers (e.g., N−1) can be handled, optionally and preferably, in a single device.

The anti-jamming device and/or method according to some embodiments of the present invention are suitable for various applications and for a variety of platforms, including, for example, man-carried backpack platforms, stationary applications, convert applications, movable devices, etc. A movable device may be any device capable of movement, including mobile devices, such as user equipment, and devices with movement, such as access nodes which experience motion from manipulation, wind, and/or other causes.

The anti-jamming device and/or method according to some embodiments of the present invention may be deployed in GNSS installations and/or systems (e.g., GPS, and/or any other RF navigational receiving system in the art)

to add further protection to existing installations which may have separate antenna(s) and/or receiver(s), as they are simple to install, require small installation times, and may not require altering existing GNSS systems. Further, as the device of the present invention is compact and requires small space (e.g., having small physical dimensions—length and/or width and/or height), and low power consumption, it is suitable for use for installations for which space and/or power are restricted, and as such, suitable for covert applications.

Further, the device and/or method according to some embodiments of the present invention can be used in various systems and/or applications, including, for example, in global navigation satellite systems (GNSS) to determine global positions of vehicles, cars, aircraft (e.g., arriving and/or departing aircraft), planes, helicopters, ships, boats, autonomous cars, drones, unmanned vehicles, homeland security, smart cities, military applications, cellular phones, mobile devices, emergency services, logistics, security, commercial operations, directional wireless communications networks, etc. In some exemplary systems and/or applications, such as in cars, the device and/or method of the invention may be used, for example, for tracking safety distance between cars.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways. Likewise, two components associated with one another can also be viewed as being "operably connected," or "operably coupled," to each other to achieve a desired functionality. For example, the boundaries between blocks are merely illustrative and alternative embodiments may merge alternate blocks or circuit elements. Thus, it is to be understood that the architectures depicted herein are merely exemplary, and that various other architectures can be implemented which achieve the same functionality. For example, RF conditioning block 102 may be composed of signal filtering and/or signal intensity amplification/reduction to fit the needs of the system according to some embodiments, and/or of an RF radiation receiver.

Some embodiments of the present invention provide a device, a method, a system, and/or may implement a computer program (e.g., a software, an application and/or an algorithm), which may include computer readable program instructions for analyzing location data obtained from RF receivers (e.g., GNSS receiver) employed in, e.g., a moving vehicle.

The computer readable program instructions may be downloaded to respective computing/processing devices from a computer readable storage medium and/or to an external computer and/or external storage device via a network, for example, the internet, a local area network, a wide area network and/or a wireless network. A network interface in the computing/processing device may receive computer readable program instructions from the network and may forward the computer readable program instructions for storage in an appropriate computer storage medium, which may be within and/or separate from the respective computing/processing device.

Some embodiments of the present invention may provide computer readable program instructions that may be partly and/or entirely executed on a server. The server may be connected to the anti-jamming device through any type of network, e.g., a local area network (LAN), a wide area network (WAN) and/or the like. Additionally and/or alternatively, the connection may be made to an external computer (for example, through the internet). In order to perform some embodiments of the present invention, a programmable logic circuitry and/or programmable logic arrays (PLA) may execute computer readable program instructions.

Some embodiments of the present invention are described herein with reference to flowchart illustrations and/or block diagrams of methods and/or systems according to some embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, devices, and/or methods according to some embodiments of the present invention. Each block in the flowchart and/or block diagrams may represent a module, segment, and/or portion of instructions, which comprises at least one executable instruction for implementing specified logical functions. Some alternative implementations utilize functions noted in the flowchart and/or block diagrams in a different order than the Figures described herein. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Each of the flowcharts depicted in FIG. 6, may be executed consecutively for continuously obtaining location data of moving vehicles (and/or objects, such as mobile devices).

Location monitoring and/or phase shift instructions calculation and/or digital signal processing may apply one or more tools (e.g., techniques, applications and/or algorithms) as known in the art. Some embodiments of the invention utilize digital signal processing comprising at least one algorithm and/or tool selected from a null-steering algorithm, and/or controlled reception pattern antenna (CRPA).

The anti-jamming device of the invention may be coupled and/or otherwise connected to a receiver for analyzing location and/or time data, such as a radio frequency (RF) receiver (e.g., Global Navigation Satellite System (GNSS), Aviation Radio Navigation Service (ARNS), Radio Navigation Satellite Service (RNSS), Global Positioning System (GPS), Galileo Positioning System, and Galileo Search and Rescue (SAR) System, etc.), optionally, at a first interconnection and may transmit location data to a server. In some embodiments, the RF radiation comprises at least one frequency band: L1 of about 1565 MHz, and/or L2 of about 1227 MHz, and/or L3 of about 1381 MHz and/or L5 of about 1176 MHz.

A plurality of phased-array anti-jamming devices may be disposed to cover an entire space environment, for example, employed in several locations in an airplane. Each anti-jamming device may cover a predetermined region in the space, and each may be assigned a distinctive location in the space by a server, which may be connected and/or otherwise coupled to the anti-jamming device via a communication network. For example, a network may be facilitated through one or more wired interface connection(s), such as, Ethernet interface connection, and/or through wireless communication network(s), including, Local Area Networks (LAN), Wide Area Network (WAN) and/or the like, an isolated WLAN (e.g., Wi-Fi), a Controller Area Network (CAN) bus, a Bluetooth network, and/or the like. However it should be recognized that some embodiments of the present invention may be utilized through other wired and/or wireless communication systems.

The anti-jamming devices may be connected and/or otherwise coupled to a processor and/or server for deducing, based on received output signals from the plurality of anti-jamming devices according to some embodiment, whether a location of a monitored vehicle is unidentified during a period of time.

Collecting monitored movement data may be carried out continuously, and/or periodically, and/or may be triggered by detection of loss of signal from a monitored vehicle.

It is expected that during the life of a patent maturing from this application many relevant devices, systems, methods and computer programs will be developed and the scope of the term phased-array device and/or anti-jamming device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A phased array anti-jamming device, comprising:
   a plurality (N) of antennas adapted to receive radio frequency (RF) radiation;
   a plurality of splitters each connected to one of the plurality of antennas and adapted to split an RF stream received from the respective antenna into:
   at least one digital processing channel conveying at least some of the RF radiation through an analog to digital convertor, and
   a plurality (M) of analog processing channels, each one of the plurality of analog processing channels conveying at least some of the RF radiation for generating a respective one of a plurality of different frequencies;
   at least one digital signal processor adapted to:
   digitally process a digital output of each of the digital processing channels and split the output into a plurality of digital down converted representations of respective analog outputs of the plurality of analog processing channels in the plurality of different frequencies, and
   determine at least one instruction selected from phase shift, amplification, and attenuation instructions for each one of the plurality of antennas per each one of the plurality of different frequencies, whereby in a summarized signal input from the plurality of antennas according to the respective phase shift, amplification, and attenuation instructions jamming signals are reduced;

a plurality of phase shifter groups each comprising at least one of a phase shifter, an amplifier, and an attenuator adapted to change at least one of phase and level of outputs of the plurality of analog processing channels in one of the plurality of different frequencies according to one of the respective phase shift, amplification, and attenuation instructions, each one of the plurality of phase shifter groups comprises a respective phase shifter for each of the plurality of antennas;

a plurality of group combiners each adapted to sum an output of one of the plurality of phase shifter groups; and a main combiner adapted to sum outputs of the plurality of group combiners.

2. The anti-jamming device of claim 1, wherein the at least one digital processing channel conveying at least some of the RF radiation through a down convertor unit.

3. The anti-jamming device of claim 1, further comprising one or more phased lock loops (PLL) and/or oscillators for setting a frequency for each of the plurality of antennas.

4. The anti-jamming device of claim 1, wherein each one of the plurality (M) of analog processing channels is adapted for conveying at least some of the RF radiation through one of a plurality of different frequency filters and wherein the plurality of different frequency filters are adapted to filter at least some of the RF radiation according to a plurality of different frequencies.

5. The anti-jamming device of claim 1, wherein the distance between two neighboring antennas in the plurality (N) of antennas is at least 5 cm.

6. The anti-jamming device of claim 1, wherein the digital signal processor utilizes at least one algorithm or tool selected from null-steering algorithm and controlled reception pattern antenna (CRPA) algorithm, to determine the at least one of phase shift, amplification, and attenuation instructions.

7. The anti-jamming device of claim 1, further comprising a plurality (N) of signal output adjusting elements each connected to a respective one of the plurality of phase shifters for each of the plurality of antennas in each of the plurality of phase shifter groups, and adapted to vary the signal output in each of the plurality of antennas.

8. The anti-jamming device of claim 7, wherein at least one of the plurality of signal output adjusting elements is a pad.

9. The anti-jamming device of claim 1, having a low-noise amplifier (LNA) gain of between 20.0 and 35.0 dB.

10. The anti-jamming device of claim 1, wherein the radio frequency (RF) radiation band received by the plurality (N) of antennas is at least one of: Global Navigation Satellite System (GNSS). Aviation Radio Navigation Service (ARNS), Radio Navigation Satellite Service (RNSS), Global Positioning System (GPS), Galileo Positioning System, and Galileo Search and Rescue (SAR) System.

11. The anti-jamming device of claim 1, wherein the RF radiation comprises at least one frequency band selected from: L1 of about 1565 MHz, L2 of about 1227 MHz, L3 of about 1381 MHz and L5 of about 1176 MHz.

12. The anti-jamming device of claim 1, having a fixed group delay of less than 100 ns, in each of a plurality of outputs of the anti-jamming device respective to one or more radiations received in each of the plurality of antennas.

13. The anti-jamming device of claim 1, further comprising an amplifier adapted to increase power intensity of at least one of the outputs of the plurality of antennas and the main combiner.

14. The anti-jamming device of claim 1, wherein the plurality of antennas (N) is at least 2.

15. A method for phased-array anti-jamming, comprising:
receiving a plurality (N) of RF radiation inputs;
splitting at least a portion of the RF radiation to:
at least one digital processing channel for conveying at least some of the RF radiation through an analog to digital convertor, and
a plurality (M) of analog processing channels for conveying at least some of the RF radiation to generate a plurality of different frequencies;
digitally processing a plurality of digital outputs from the at least one digital processing channel per antenna and splitting the digital outputs into a plurality of digital down converted representations of respective analog outputs of the plurality of analog processing channels in the plurality of different frequencies;
determining at least one instructions selected from phase shift, amplification, and attenuation instructions for each one of the plurality of antennas per each one of the plurality of different frequencies, whereby in a summarized signal input from the plurality (N) of RF radiation inputs according to the respective phase shift, amplification, and attenuation instructions jamming signals are reduced;
changing at least one of phase and level of outputs in the plurality of analog processing channels in one of the plurality of different frequencies according to one of the respective phase shift, amplification, and attenuation instructions via a plurality of phase shifter groups each comprising a respective phase shifter for each of the plurality (N) of RF radiation inputs;
combining sum of an output of one of the plurality of phase shifter groups in a plurality of group combiners; and
combining the sum outputs of the plurality of group combiners.

16. The method of claim 15, wherein the changing phase of outputs further comprises at least one of: down converting and filtering.

17. The method of claim 15, wherein the determining the at least one of phase shift, amplification, and attenuation instructions is carried out by an algorithm or tool selected from null-steering algorithm and controlled reception pattern antenna (CRPA) algorithm.

18. The method of claim 17, wherein the combined sum of outputs is transmitted to a single receiver.

* * * * *